(12) United States Patent
Wong

(10) Patent No.: US 10,501,165 B2
(45) Date of Patent: Dec. 10, 2019

(54) SOUND ABSORBERS FOR AIRFRAME COMPONENTS

(71) Applicant: BOMBARDIER INC., Dorval (CA)

(72) Inventor: Raymond Lee Man Wong, Thornhill (CA)

(73) Assignee: BOMBARDIER INC., Dorval (CA)

( * ) Notice: Subject to any disclaimer, the term of this patent is extended or adjusted under 35 U.S.C. 154(b) by 264 days.

(21) Appl. No.: 15/535,841

(22) PCT Filed: Dec. 9, 2015

(86) PCT No.: PCT/IB2015/059473
§ 371 (c)(1),
(2) Date: Jun. 14, 2017

(87) PCT Pub. No.: WO2016/097939
PCT Pub. Date: Jun. 23, 2016

(65) Prior Publication Data
US 2017/0369147 A1  Dec. 28, 2017

Related U.S. Application Data

(60) Provisional application No. 62/093,458, filed on Dec. 18, 2014.

(51) Int. Cl.
*B64C 1/40* (2006.01)
*B64C 21/02* (2006.01)
(Continued)

(52) U.S. Cl.
CPC ............... *B64C 1/40* (2013.01); *B64C 3/187* (2013.01); *B64C 3/26* (2013.01); *B64C 21/02* (2013.01);
(Continued)

(58) Field of Classification Search
CPC .. B64C 1/40; B64C 3/187; B64C 3/26; B64C 21/02; B64C 2230/08; B64C 2230/14;
(Continued)

(56) References Cited

U.S. PATENT DOCUMENTS 2,833,492 A * 5/1958 Fowler ................... B64C 21/06
244/209
4,235,303 A * 11/1980 Dhoore ................ B64D 33/02
181/214
(Continued)

FOREIGN PATENT DOCUMENTS

CN  102143889 A  8/2011
DE  10041458 A1  3/2002
(Continued)

OTHER PUBLICATIONS

China National Intellectual Property Administration, Notification of First Office Action dated Dec. 24, 2018 application No. 201580069461.7.
(Continued)

*Primary Examiner* — Rodney A Bonnette
(74) *Attorney, Agent, or Firm* — Norton Rose Fulbright Canada LLP

(57) ABSTRACT

Sound absorbers and airframe components comprising such sound absorbers are disclosed. In one embodiment, an airframe component comprises an aerodynamic surface (48) and a sound absorber (38). The sound absorber (38) comprises a perforated panel (40) having a front side exposed to an ambient environment outside of the airframe component and an opposite back side. The panel (40) comprises perforations extending through a thickness of the panel for permitting passage of sound waves therethrough. The sound absorber (38) also comprises a boundary surface spaced apart from the perforated panel. The boundary surface and the back side of the perforated panel (40) at least partially
(Continued)

define a cavity in the airframe component for attenuating some of the sound waves entering the cavity via the perforations in the perforated panel (40).

28 Claims, 11 Drawing Sheets

(51) Int. Cl.
    *B64C 3/18*     (2006.01)
    *B64C 3/26*     (2006.01)
    *B64D 33/02*     (2006.01)

(52) U.S. Cl.
    CPC ...... *B64C 2230/08* (2013.01); *B64C 2230/14* (2013.01); *B64C 2230/22* (2013.01); *B64C 2230/24* (2013.01); *B64D 2033/0206* (2013.01); *Y02T 50/166* (2013.01)

(58) Field of Classification Search
    CPC ............ B64C 2230/22; B64C 2230/24; B64D 2033/0206; Y02T 50/166
    See application file for complete search history.

(56) References Cited

U.S. PATENT DOCUMENTS

| | | | |
|---|---|---|---|
| 4,759,513 A | 7/1988 | Birbragher | |
| 5,540,406 A | 7/1996 | Occhipinti | |
| 5,592,813 A | 1/1997 | Webb | |
| 5,721,402 A * | 2/1998 | Parente | B64C 21/04 181/214 |
| 6,092,990 A | 7/2000 | Hassan et al. | |
| 6,454,219 B1 * | 9/2002 | Moe | B64C 3/50 244/214 |
| 6,622,973 B2 | 9/2003 | Al-Garni et al. | |
| 7,971,684 B2 | 7/2011 | Gantie et al. | |
| 8,181,900 B2 | 5/2012 | Chene et al. | |
| 8,584,363 B2 | 11/2013 | Caruel | |
| 8,695,915 B1 | 4/2014 | Jones et al. | |
| 9,302,761 B2 * | 4/2016 | Isotani | B64C 9/18 |
| 2007/0020099 A1 | 1/2007 | Hutcheson et al. | |
| 2009/0210103 A1 | 8/2009 | Cook | |
| 2009/0261204 A1 | 10/2009 | Pitt | |
| 2014/0209737 A1 | 7/2014 | Cook et al. | |
| 2016/0107746 A1 * | 4/2016 | Tiwari | B64C 7/02 137/565.23 |

FOREIGN PATENT DOCUMENTS

| | | |
|---|---|---|
| EP | 1408483 A1 | 4/2004 |
| EP | 2692632 A1 | 2/2014 |
| WO | 2011099276 A1 | 8/2011 |
| WO | 2011144842 A2 | 11/2011 |
| WO | 2014037857 A1 | 3/2014 |

OTHER PUBLICATIONS

English translation of patent document No. CN102143889A dated Aug. 3, 2011, https://patents.google.com/patent/CN102143889A/en?oq=CN102143889A accessed on Mar. 13, 2019.

European Patent Office, Communication pursurant to Article 94(3) EPC dated Jun. 15, 2018 re: application No. 15816884.9.

PCT International Search Report and Written Opinion dated Feb. 29, 2016 re: International Patent Application No. PCT/IB2015/059473.

English translation of Patent Document No. WO2011099276 dated Aug. 18, 2011, https://www.google.ca/patents/WO2011099276A1?cl=en&dq=WO2011099276&hl=en&sa=X&ved=0ahUKEwiD5eblmZXUAhWFSyYKHdz7DW8Q6AElljAA.

English translation of Patent Document No. WO2011144842 dated Nov. 24, 2011, https://www.google.ca/patents/WO2011144842A2?dq=WO2011144842&cl=en.

Khorrami et al., Aeroacoustic Evaluation of Flap and Landing Gear Noise Reduction Concepts, AIAA Aviation, Jun. 16-20, 2014, 20th AIAA / CEAS Aerocoustics Conference, pp. 1-28, Atlanta, GA.

Dah-You Maa, Potential of microperforated panel absorber, Institute of Acoustics, Academia Sinica, vol. 104, No. 5, Nov. 1998, pp. 2861-2866, Beijing.

Tao et al., Prediction of Sound-Absorbing Performance of Micro-Perforated Panels using the Transfer Matrix Method, Society of Automotive Engineers, Inc., 05NVC-339, 2005, pp. 1-4, University of Kentucky.

Ma et al., Attenuation of slat trailing edge noise using acoustic liners, International Journal of Aeroacoustics, vol. 5, No. 4, 2006, pp. 311-333, Southampton UK.

Yong et al., Control strategies for aircraft airframe noise reduction, Chinese Journal of Aeronautics, vol. 26, No. 2, 2013, pp. 249-260.

English translation of Patent document No. DE10041458 A1 dated Mar. 14, 2002, http://www.google.com/patents/DE10041458A1?cl=en.

* cited by examiner

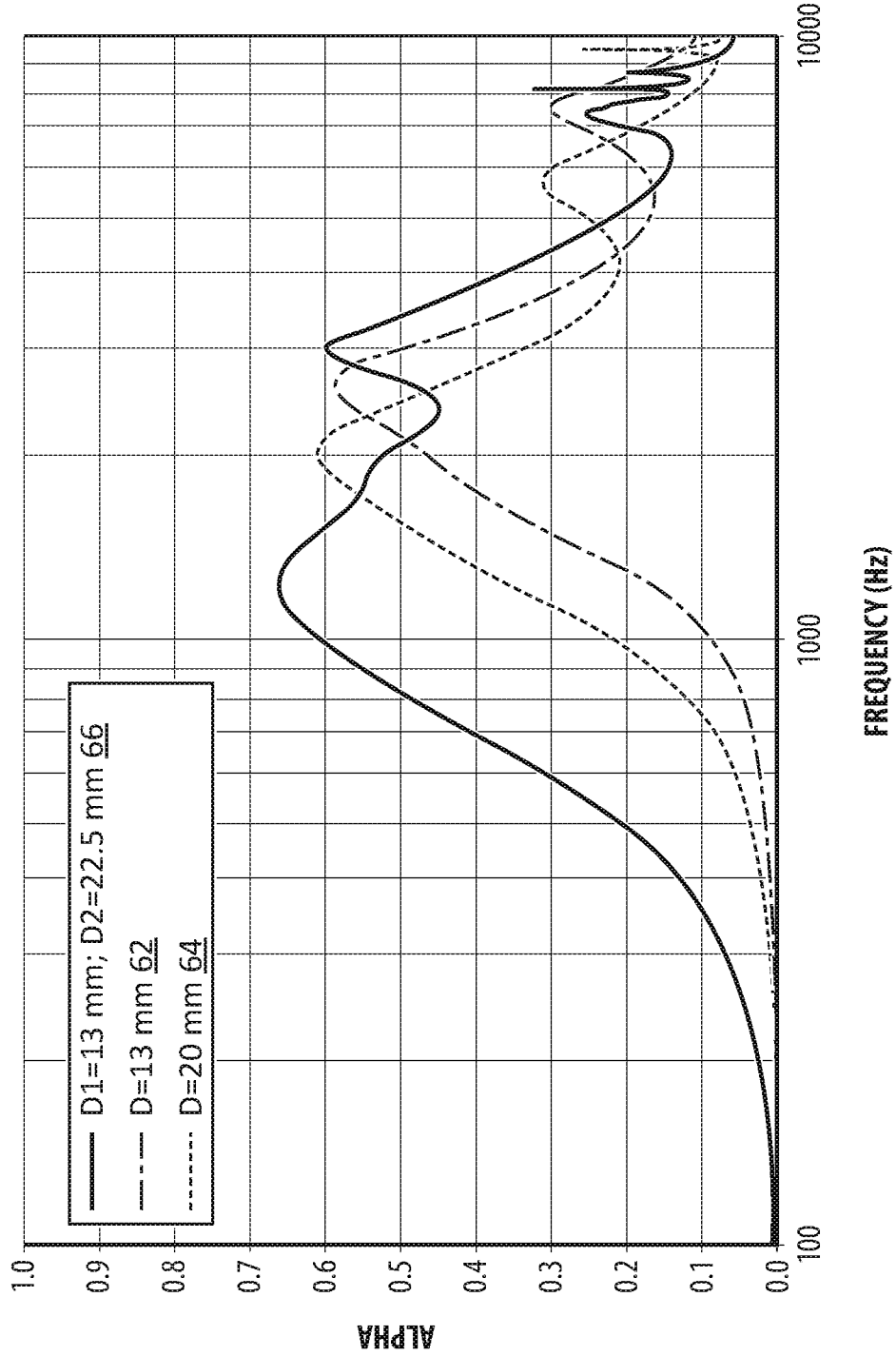

SOUND ABSORBERS FOR AIRFRAME COMPONENTS

CROSS-REFERENCE TO RELATED APPLICATION(S)

This application is a national phase application under 35 U.S.C. 371 of International Patent Application No. PCT/IB2015/059473 filed on Dec. 9, 2015, which claims priority from U.S. provisional patent application No. 62/093,458, filed on Dec. 18, 2014, the entire contents of which are hereby incorporated by reference.

TECHNICAL FIELD

The disclosure relates generally to noise attenuation for aircraft and other mobile platforms, and more particularly to sound absorbers and airframe components incorporating such sound absorbers.

BACKGROUND OF THE ART

Reducing aircraft noise is important to the growth of air transport and for improving the quality of life of people living near airports. The noise associated with an aircraft can be produced from various sources on the aircraft and by various mechanisms. For example, an aircraft engine can be a dominant source of noise during take-off and landing of an aircraft, and, airframe noise can be a significant component of aircraft noise during approach and landing when the high-lift devices and landing gear are deployed.

The use of noise attenuating devices with engine nacelles and also on some airframe components is known. However, existing techniques for attenuating noise generated by airframe components can have an adverse effect on the aerodynamic characteristics of such airframe components.

Improvement is therefore desirable.

SUMMARY

In one aspect, the disclosure describes an airframe component of an aircraft where the airframe component comprises:
an aerodynamic surface having a side edge; and
a sound absorber comprising:
a perforated panel disposed at or adjacent the side edge of the aerodynamic surface, the perforated panel having a front side exposed to an ambient environment outside of the airframe component and an opposite back side, the panel comprising perforations extending through a thickness of the panel for permitting passage of sound waves therethrough; and
a boundary surface spaced apart from the perforated panel, the boundary surface and the back side of the perforated panel at least partially defining a cavity in the airframe component for attenuating some of the sound waves entering the cavity via the perforations in the perforated panel.

A distance between the boundary surface and the back side of the perforated panel may be between about 1 cm and about 10 cm.

The thickness of the perforated panel may be between about 0.5 mm and about 3 mm.

An average cross-sectional dimension of the perforations may be less than 1 mm.

The perforated panel may have a perforation percentage between about 0.5% and about 10%.

The cavity may be free of cellular structures.

The perforated panel may be oriented transversely to the aerodynamic surface.

The perforated panel may be oriented substantially parallel to the aerodynamic surface.

The perforated panel may define at least part of the aerodynamic surface.

The perforated panel may be at a distance from a leading edge of the aerodynamic surface.

The airframe component may comprise a high-lift device.

The airframe component may comprise a flap.

The airframe component may comprise a slat.

The airframe component may be deployable.

The airframe component may comprise a fixed leading edge.

The perforated panel may be disposed in a cove of a slat.

The perforated panel may comprise a close-out plate of a high-lift device.

The perforated panel may be part of a closing rib of a high-lift device.

The boundary surface may be part of a rib of a high-lift device.

The boundary surface may be defined by a wall that is attached to the perforated panel.

A substantially air-tight seal may be provided between the wall and the perforated panel.

The wall and the perforated panel may have a unitary construction.

The perforated panel may be a first perforated panel and the airframe component may comprise a second perforated panel disposed between the first perforated panel and the boundary surface to form two internal sound-attenuating cavities in series between the back side of the first perforated panel and the boundary surface.

In another aspect, the disclosure describes an airframe component of an aircraft where the airframe component comprises:
a skin defining an aerodynamic surface;
a closing rib supporting the skin, the closing rib comprising perforations extending through a thickness of the closing rib for permitting passage of sound waves therethrough; and
a boundary surface spaced apart from the closing rib, the boundary surface and the closing rib at least partially defining a cavity in the airframe component for attenuating some of the sound entering the cavity via the perforations in the closing rib.

The airframe component may comprise a perforated panel disposed between the closing rib and the boundary surface to form two internal sound-attenuating cavities in series between the closing rib and the boundary surface.

The airframe component may comprise a high-lift device.

The airframe component may comprise a fixed leading edge.

The cavity may be free of cellular structures.

In another aspect, the disclosure describes an airframe component of an aircraft where the airframe component comprises:
a skin defining an aerodynamic surface having a side edge; and
a close-out plate disposed at or adjacent the side edge of the aerodynamic surface, the close-out plate having a front side exposed to an ambient environment outside of the airframe component and a back side, the close-out plate comprising perforations extending through a thickness of the close-out plate for permitting passage of sound waves therethrough; and a rib supporting the skin, the rib comprising a boundary surface spaced apart from the close-out plate, the boundary surface and the back side of the close-out plate at least partially defining a cavity in the airframe component for attenuating some of the sound entering the cavity via the perforations in the close-out plate.

The airframe component may comprise a high-lift device.

The airframe component may comprise a fixed leading edge.

The cavity may be free of cellular structures.

In another aspect, the disclosure describes an airframe component of an aircraft where the airframe component comprises:

an aerodynamic surface; and
a sound absorber comprising:
 a perforated panel disposed adjacent the aerodynamic surface or defining part of the aerodynamic surface, the perforated panel having a front side exposed to an ambient environment outside of the airframe component and an opposite back side, the panel comprising perforations extending through a thickness of the panel for permitting passage of sound waves therethrough; and
 a boundary surface spaced apart from the perforated panel, the boundary surface and the back side of the perforated panel at least partially defining a cavity in the airframe component for attenuating some of the sound waves entering the cavity via the perforations in the perforated panel, the cavity being free of cellular structures.

A distance between the boundary surface and the back side of the perforated panel may be between about 1 cm and about 10 cm.

The thickness of the perforated panel may be between about 0.5 mm and about 3 mm.

An average cross-sectional dimension of the perforations may be less than 1 mm.

The perforated panel may have a perforation percentage between about 0.5% and about 10%.

The perforated panel may be oriented transversely to the aerodynamic surface.

The perforated panel may be oriented substantially parallel to the aerodynamic surface and may define part of the aerodynamic surface.

The perforated panel may be at a distance from a leading edge of the aerodynamic surface.

The airframe component may comprise a high-lift device.

The perforated panel may be disposed at or near a side edge of the high-lift device.

The airframe component may comprise a flap.

The airframe component may comprise a slat.

The airframe component may be deployable.

The airframe component may comprise a fixed leading edge.

The perforated panel may be disposed at or near a side edge of the fixed leading edge.

The perforated panel may comprise a close-out plate of a high-lift device.

The perforated panel may be disposed in a cove of a slat.

The perforated panel may be part of a closing rib of a high-lift device.

The boundary surface may be part of a rib of a high-lift device.

The boundary surface may be defined by a wall that is attached to the perforated panel. The wall may be substantially sealed with the perforated panel. The wall and the perforated panel may have a unitary construction.

The airframe component may comprise a landing gear door.

The perforated panel may be a first perforated panel and the airframe component may comprise a second perforated panel disposed between the first perforated panel and the boundary surface to form two internal sound-attenuating cavities in series between the back side of the first perforated panel and the boundary surface.

In another aspect, the disclosure describes a landing gear door for an aircraft. The landing gear door comprises:

a skin defining an aerodynamic surface on a first side of the landing gear door; and
a sound absorber comprising:
 a perforated panel disposed on a second side of the landing gear door opposite the aerodynamic surface, the perforated panel having a front side exposed to an ambient environment outside of the aircraft and an opposite back side, the panel comprising perforations extending through a thickness of the panel for permitting passage of sound waves therethrough; and
 a boundary surface spaced apart from the perforated panel, the boundary surface and the back side of the perforated panel at least partially defining a cavity in the landing gear door for attenuating some of the sound waves entering the cavity via the perforations in the perforated panel.

The boundary surface may be defined by a side of the skin opposite the aerodynamic surface.

The cavity may be free of cellular structures.

A wall defining the boundary surface may be attached to the perforated panel to form a sound absorber having a unitary construction.

In another aspect, the disclosure describes an aircraft comprising one or more landing gear doors as described herein.

In another aspect, the disclosure describes a sound absorber of unitary construction for incorporation into part of a mobile platform as a unit. The sound absorber comprises:

a perforated panel having a front side for exposure to an ambient environment outside of the mobile platform and an opposite back side, the panel comprising perforations extending through a thickness of the panel for permitting passage of sound waves therethrough; and
a wall defining a boundary surface spaced apart from the perforated panel, the boundary surface and the back side of the perforated panel at least partially defining a cavity for attenuating some of the sound waves entering the cavity via the perforations in the perforated panel, the wall being attached to the perforated panel to form a unitary construction.

A distance between the boundary surface and the back side of the perforated panel may be between about 1 cm and about 10 cm.

The thickness of the perforated panel may be between about 0.5 mm and about 3 mm.

An average cross-sectional dimension of the perforations may be less than 1 mm.

The perforated panel may have a perforation percentage between about 0.5% and about 10%.

The cavity may be free of cellular structures.

A substantially air-tight seal may be provided between the wall and the perforated panel.

In another aspect, the disclosure describes an aircraft comprising one or more airframe components as described herein.

In another aspect, the disclosure describes an aircraft comprising one or more sound absorbers as described herein.

Further details of these and other aspects of the subject matter of this application will be apparent from the detailed description and drawings included below.

DESCRIPTION OF THE DRAWINGS

Reference is now made to the accompanying drawings, in which:

FIG. 16 shows plots of absorption coefficients as a function of frequency for three different sound absorber constructions according to the present disclosure.

DETAILED DESCRIPTION

The present disclosure relates to sound absorbers for mobile platforms and components incorporating such sound absorbers. In various embodiments, the sound absorbers disclosed herein may be suitable for use on aircraft, trains, ships, automotive, defense and other applications. For example, the sound absorbers disclosed herein may be incorporated into airframe components such as the fuselage, wings, tails and landing gear assemblies, and, may be suitable for relatively high airflow environments. Such airframe components may comprise components of an aircraft other than an engine. In various embodiments, the sound absorbers disclosed herein may be configured to attenuate some of the sound generated from the interactions of gas (e.g., air) flows with solid objects such as aerodynamic surfaces for example. Accordingly, airframe components incorporating one or more sound absorbers may also define one or more aerodynamic surfaces. In some embodiments, the sound absorbers disclosed herein may be configured to attenuate some of the sound generated by landing gear assemblies, landing gear doors and/or other devices for aerodynamic control including those known as "high-lift" devices such as flaps and slats. For example, the sound absorbers disclosed herein may be used to attenuate sound generated at or near the edges of such high-lift devices. In some embodiments, the sound absorbers disclosed herein may not significantly affect the aerodynamic characteristics of the airframe component(s) into which they are integrated.

Aspects of various embodiments are described through reference to the drawings.

Figure 1:
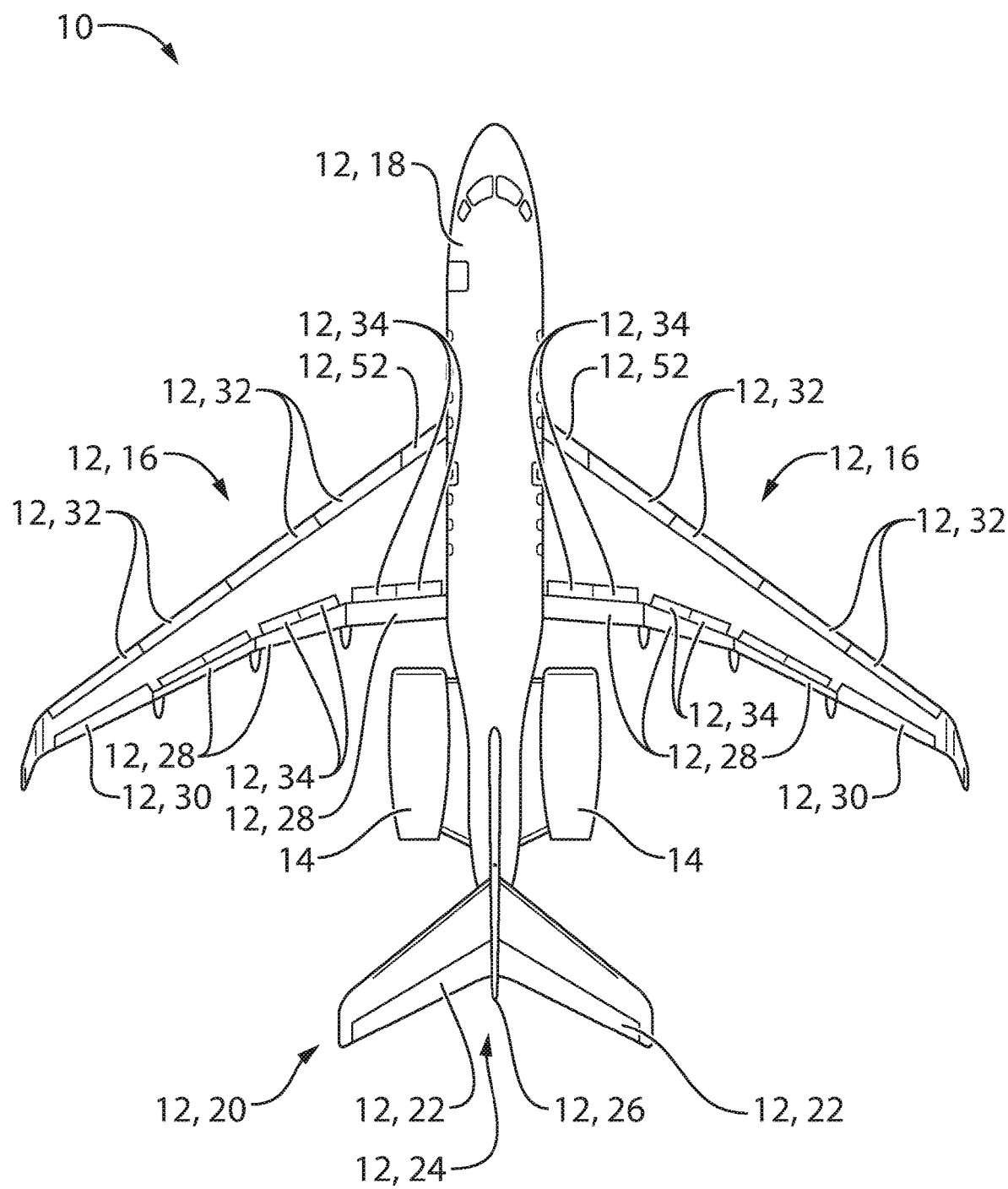
FIG. 1 shows a top plan view of an exemplary aircraft comprising one or more airframe components according to the present disclosure.

FIG. 1 shows a top plan view of an exemplary aircraft 10 comprising one or more airframe components 12 having one or more integrated sound absorbers according to the present disclosure. Aircraft 10 may be any aircraft such as corporate, private, commercial or any other type of aircraft including passenger aircraft suitable for civil aviation, or, unmanned aircraft. For example, aircraft 10 may be a narrow-body, twin-engine jet airliner. Aircraft 10 may be a fixed-wing aircraft or a rotary-wing aircraft. Airframe component 12 may comprise or be part of any suitable part including the basic structure of aircraft 10, other than engines 14, that may comprise one or more aerodynamic surfaces. For example, airframe component 12 may comprise or may be part of one or more of: wing 16, fuselage 18, horizontal stabilizer 20, elevator 22, vertical stabilizer 24, rudder 26, flap 28, aileron 30, slat 32, spoiler 34 and fixed leading edge 52. As explained below airframe component 12 may also comprise one or more landing gear doors 36 (see FIG. 13).

Figure 2:
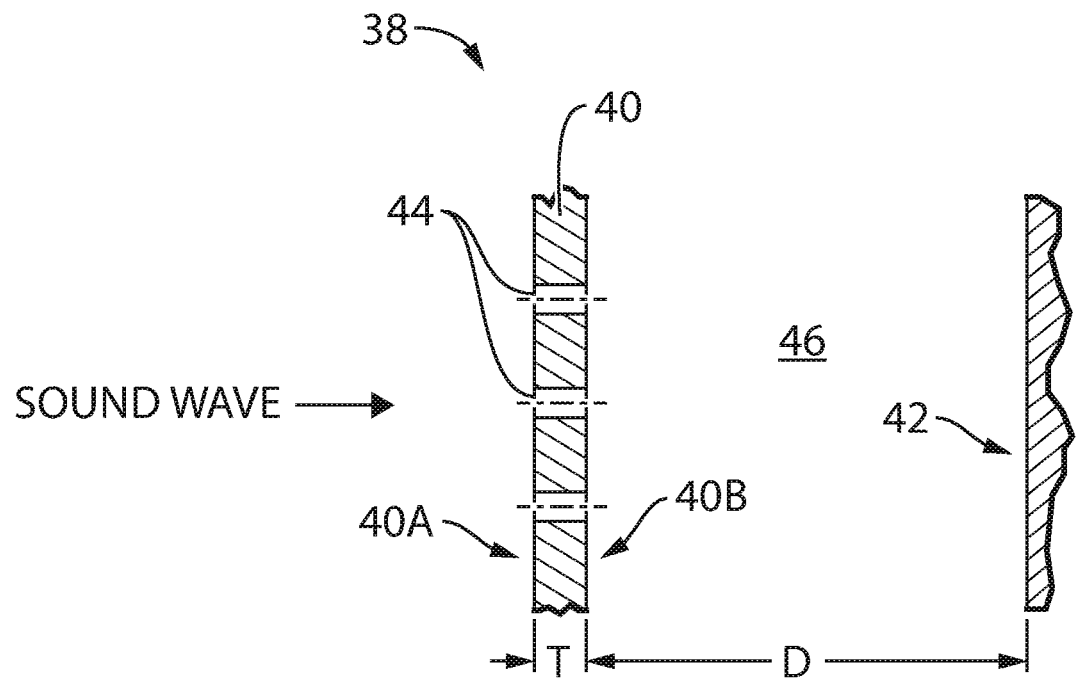
FIG. 2 is a schematic representation of an exemplary sound absorber that may be incorporated into one or more airframe components of the aircraft of FIG. 1.

FIG. 2 is a schematic representation of an exemplary sound absorber 38 that may be incorporated into one or more airframe components 12 of aircraft 10. In some embodiments, airframe component 12 may comprise one or more sound absorbers 38. For example, a high-lift device (e.g., flap 28 and/or slat 32) may comprise one or more sound absorbers 38 disposed at or near one or more side edges thereof. Sound absorber 38 may be of the type known as a micro-perforated panel (MPP) absorber. Sound absorber 38 may comprise one or more perforated panels 40 and one or more boundary surfaces 42. Perforated panel 40 may have front side 40A exposed to the ambient environment outside of aircraft 10 and opposite back side 40B. Even though perforated panel 40 may be exposed to the ambient environment, in some embodiments perforated panel 40 may not be considered an aerodynamic surface interacting with a flow of air for the purpose of generating lift or controlling an aspect of operation of aircraft 10. Alternatively, in some embodiment, perforated panel 40 may define at least part of an aerodynamic surface of airframe component 12.

Panel 40 may comprise perforations 44 extending through a thickness T of panel 40 for permitting passage of sound waves therethrough. Boundary surface 42 may be spaced apart from perforated panel 40 so that boundary surface 42 and back side 40B of perforated panel 40 may at least partially define internal cavity 46 for attenuating some of the sound waves entering cavity 46 via perforations 44 in perforated panel 40. In some embodiments, internal cavity 46 may be a resonant cavity and sound absorber 38 may, as explained below, attenuate sound based on the Helmholtz resonance phenomenon. In some embodiment, front side 40A and/or back side 40B of perforated panel 40 may be substantially flat and perforations 44 (which may be submillimeter in size) may, in cooperation with cavity 46, attenuate sound. Alternatively, in some embodiments, at least part of perforated panel 40 may be curved. In some embodiments, sound absorber 38 may be relatively lightweight and easy to clean/maintain.

Some attenuation of the sound waves due to viscous friction may occur when the sound waves penetrate perforated panel 40 through perforations 44 having relatively small cross-sectional areas. For example, perforated panel 40 may be acoustically resistive. In various embodiments, perforations 44 may have a substantially circular cross-sectional shape or may have other suitable cross-sectional shapes. For example, at least some of perforations 44 may have a substantially circular cross-sectional shape having an average diameter of between about 0.2 mm and about 2 mm. Perforations 44 are not necessarily drawn to scale in the accompanying drawings. In some embodiments, perforated panel 40 may be a micro-perforated panel (e.g., plate) comprising perforations 44 of substantially circular cross-sections and having an average diameter of less than 1 mm (i.e., submillimeter diameter). For example, in some embodiments, perforations 44 may have diameters between about 0.05 mm and about 0.5 mm. Alternatively, at least some perforations 44 may have a non-circular cross-sectional shape having an average cross-sectional dimension of between about 0.2 mm and about 2 mm. For example, perforations 44 may comprise slits having a width of between about 0.2 mm and about 2 mm.

In various embodiments, perforated panel 40 may have a perforation percentage (i.e., the area of perforations 44 divided by the area of perforated panel 40) between about 0.5% and about 10%. In some embodiments, perforations 44 may be of relatively uniform size and shape. Alternatively, perforations 44 may be of non-uniform sizes and shapes.

Cavity 46 may have a depth D chosen to cause attenuation (e.g., at least partial cancellation) of at least some of the sound waves entering cavity 46 at a wavelength (i.e., frequency) of interest. In some embodiments, depth D of cavity 46 may be substantially uniform so that back side 40B of perforated panel 40 and boundary surface 42 may be substantially parallel. Alternatively, depth D of cavity 46 may not necessarily be uniform. For example, different parts of cavity 46 may have different depths D so as to attenuate sound of different frequencies. Depth D is illustrated in FIG. 2 as representing a distance between back surface 40B of perforated panel 40 and boundary surface 42.

Cavity 46 may contain air but may otherwise be hollow. For example, in some embodiments, cavity 46 may be substantially empty. For example, cavity 46 may not contain (e.g., may be free of) any honeycomb or other cellular (e.g. alveolar) structures therein. In some embodiments, cavity 46 may not contain any other sound-absorbing substance(s) disposed therein.

Boundary surface 42 may comprise a relatively hard surface that may be reflective to at least some of the sound waves entering cavity 46. Accordingly, depth D of cavity 46 may be selected so that a sound wave having been reflected from boundary surface 42 and traveling toward perforated panel 40 would cause attenuation of a subsequent sound wave having penetrated perforated panel 40 and traveling toward boundary surface 42. Depending on the space available, it may be advantageous to select a depth D of cavity 46 that is a multiple of a quarter of the wavelength to be attenuated in order to improve attenuation. In various embodiments, depth D of cavity 46 may be between about 1 cm and about 25 cm depending on the frequency of interest to be attenuated. For example, in some embodiments, depth D of cavity 46 may be between about 1 cm and about 10 cm.

Sound absorber 38 may be tunable to provide attenuation within a desired frequency range. For example, parameters such as depth D of cavity 46, thickness T of perforated panel 40, diameter of perforations 44 and perforation percentage may be selected based on a desired frequency or range of frequencies that is to be attenuated. In various embodiments, thickness T of perforated panel 40 may be between about 0.5 mm and about 3 mm.

Perforated panel 40 may comprise a polymer, a metallic material such as aluminum or (e.g., stainless) steel or a fiber-reinforced composite material. Perforations 44 may be produced using laser drilling, conventional drilling or other suitable material-removal process.

Figure 3:
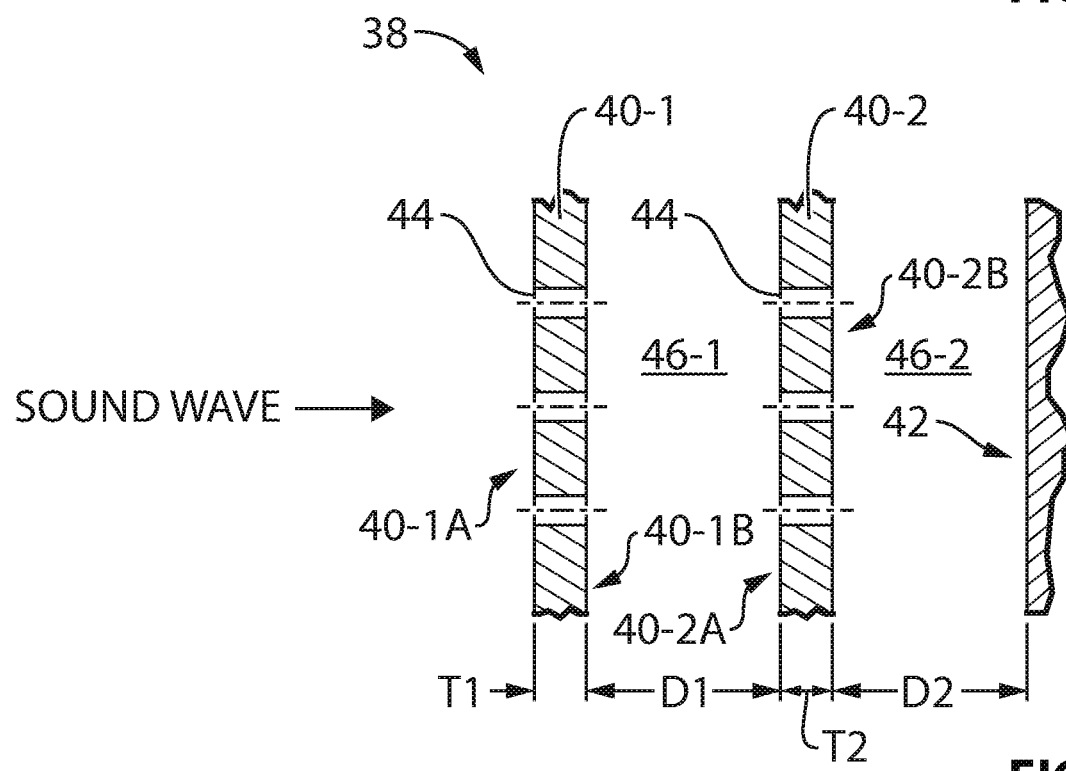
FIG. 3 is a schematic representation of another exemplary sound absorber that may be incorporated into one or more airframe components of the aircraft of FIG. 1.

FIG. 3 is a schematic representation of another exemplary sound absorber 38 that may be incorporated into one or more airframe components 12. The embodiment of sound absorber 38 shown in FIG. 3 may operate according to the same principles as those of FIG. 2 but may comprise two resonant cavities 46-1 and 46-2 that are functionally disposed in series. In accordance with FIG. 3, sound absorber 38 may comprise first perforated panel 40-1 and second perforated panel 40-2 disposed between first perforated panel 40-1 and boundary surface 42 to form two internal sound-attenuating cavities 46-1, 46-2 in series between back side 40-1B of first perforated panel 40-1 and boundary surface 42. Front side 40-1A of first perforated panel 40-1 may be exposed to the ambient environment outside of aircraft 10. Front side 40-2A of second perforated panel 40-2 may function as a boundary surface defining first cavity 46-1 of depth D1 together with back side 40-1B of first perforated panel 40-1. Similarly, back side 40-2B of second perforated panel 40-2 and boundary surface 42 may define second cavity 46-2 of depth D2.

The use of two cavities 46-1 and 46-2 instead of one may tailor/improve the absorption characteristics of sound absorber 38. For example, the use of two cavities 46-1 and 46-2 may be used to broaden the range of frequencies to be attenuated by sound absorber 38 in comparison with using only one cavity 46 as shown in FIG. 2 (e.g., as illustrated by the plots of FIG. 16). The acoustic properties of sound absorber 38 may be tailored by the selection of parameters such as depth D1 of cavity 46-1, depth D2 of cavity 46-2, thickness T1 of first perforated panel 40-1, thickness T2 of second perforated panel 40-2, cross-sectional area and shape of perforations 44 in each perforated panel 40-1, 40-2 and perforation percentage in each perforated panel 40-1, 40-2. The ranges of values provided above for the embodiment of sound absorber 38 shown in FIG. 2 may also be applicable to the embodiment of sound absorber 38 shown in FIG. 3. Also, sound absorber 38 may comprise more than two resonant cavities 46-1 and 46-2 in some embodiments.

Figure 4:
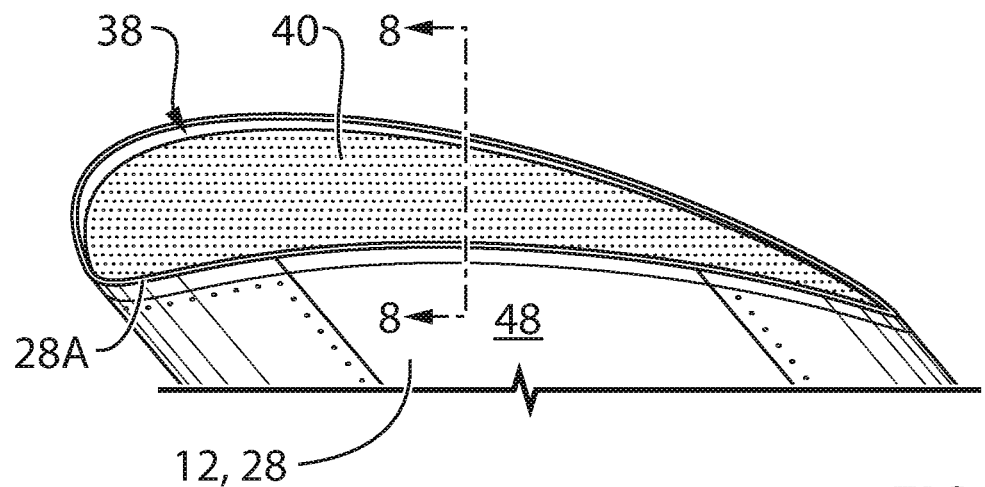
FIG. 4 is a perspective view of a flap of the aircraft of FIG. 1 showing a side edge of the flap.

FIG. 4 is a perspective view of flap 28 of aircraft 10 showing side edge 28A of flap 28. Flap 28 may be deployable and retractable with respect to wing 16 to which flap 28 may be mounted. Flap 28 may comprise one or more skins 48 defining one or more aerodynamic surfaces which may be used to alter the aerodynamic characteristics of wing 16 during some phases of flight. For example, flap 28 may be considered a "high lift" trailing edge device that is deployed during take-off and/or landing phases of aircraft 10. It should be noted that reference character "48" is used in the present disclosure to denote skins defining different types of aerodynamic surfaces on different parts of aircraft 10 and that interact with an air flow to perform different functions such as generating lift and/or controlling some aspect of flight of aircraft 10. Therefore, reference to skin 48 should not be limited to those defining surfaces that perform a particular aerodynamic function.

As shown in FIG. 4, perforated panel 40 may be exposed to the ambient environment outside of aircraft 10. Perforated panel 40 may be disposed adjacent one or more aerodynamic surfaces defined by skin 48. For example, perforated panel 40 may comprise a close-out plate or be part of a closing rib for flap 28 and may be disposed at or near side edge 28A of flap 28. Accordingly, perforated panel 40 may be oriented transversely to skin 48. In some embodiments, perforated panel 40 may be substantially orthogonal to skin 48.

Figure 5:
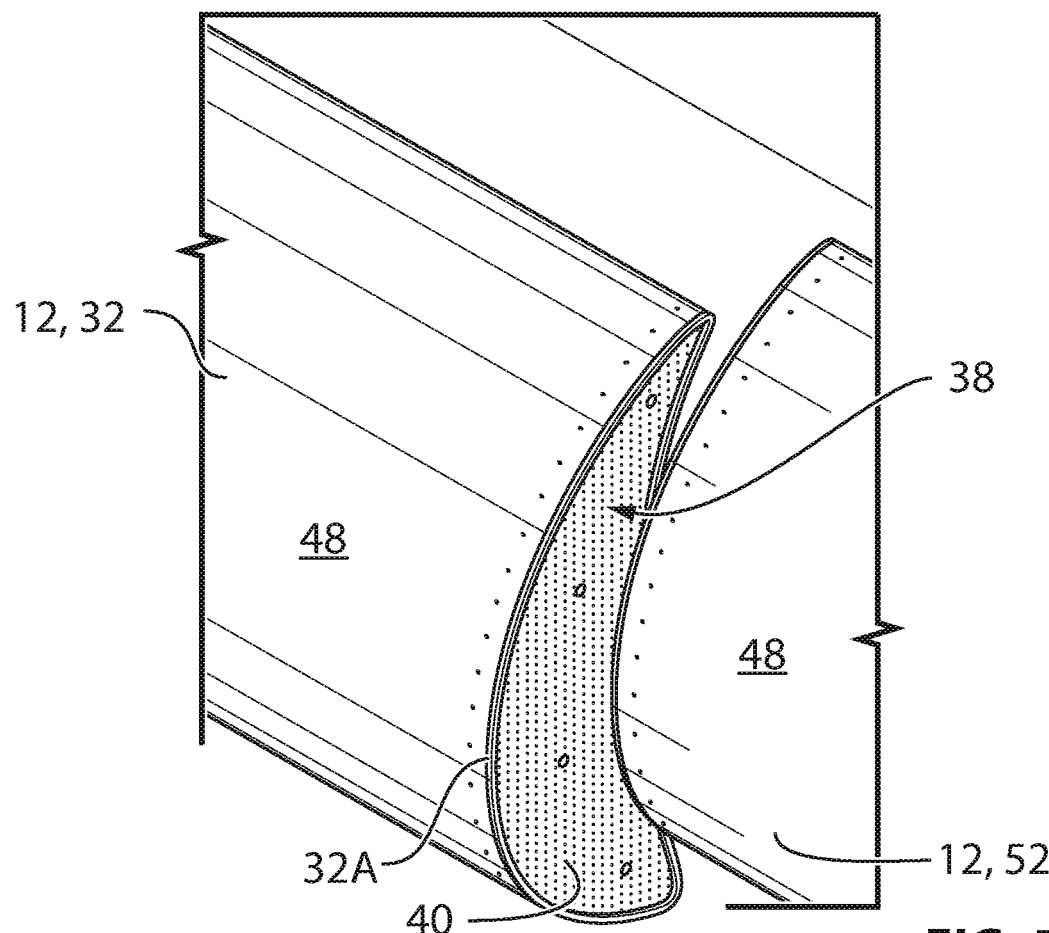
FIG. 5 is a perspective view of a slat of the aircraft of FIG. 1 showing a side edge of the slat.

FIG. 5 is a perspective view of slat 32 of aircraft 10 showing side edge 32A of slat 32. Slat 32 may be deployable and retractable with respect to wing 16 to which slat 32 may be mounted. Slat 32 may comprise one or more skins 48 defining one or more aerodynamic surfaces which may be used to alter the aerodynamic characteristics of wing 16 during some phases of flight. For example, slat 32 may be considered a "high lift" leading edge device that is deployed during take-off and/or landing phases of aircraft 10. Perforated panel 40 may be exposed to the ambient environment outside of aircraft 10. Perforated panel 40 may be adjacent one or more aerodynamic surfaces defined by skin 48. For example, perforated panel 40 may comprise a close-out plate or be part of a closing rib for slat 32 and may be disposed at or near side edge 32A of slat 32. Accordingly, perforated panel 40 may be oriented transversely to skin 48. In some embodiments, perforated panel 40 may be substantially orthogonal to skin 48.

Figure 6:
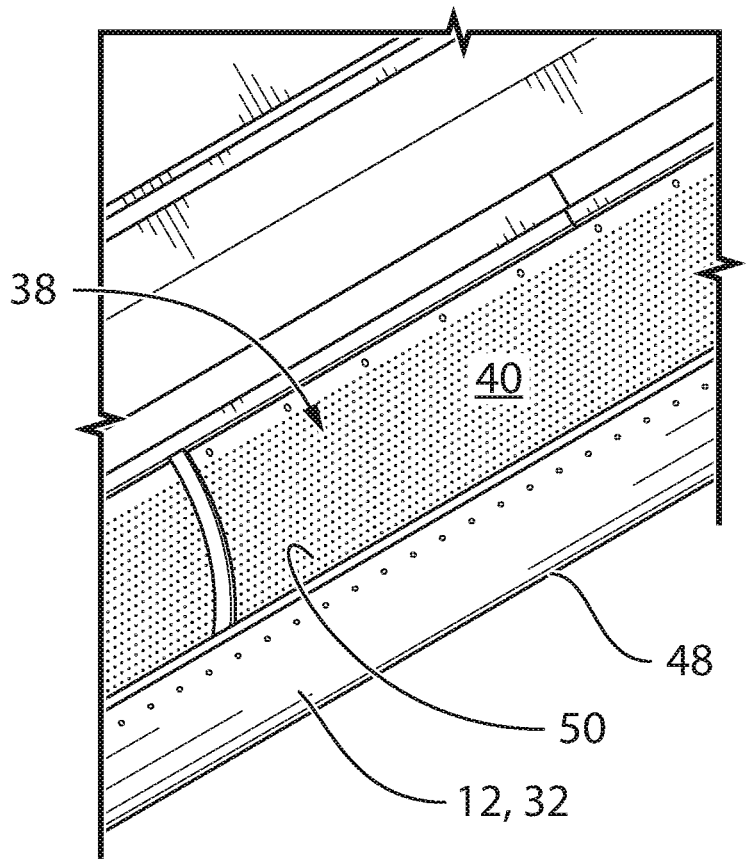
FIG. 6 is a perspective view of the slat of FIG. 5 showing a cove of the slat.

FIG. 6 is a perspective view of slat 32 of aircraft 10 showing cove 50 of slat 32. Sound absorber 38 may be disposed in the region of cove 50 of slat 32. For example, perforated panel 40 may comprise a panel or covering of slat 32 disposed in the region of cove 50. A suitable boundary surface 42 (not shown in FIG. 6) may be disposed behind perforated panel 40 as explained above.

Figure 7:
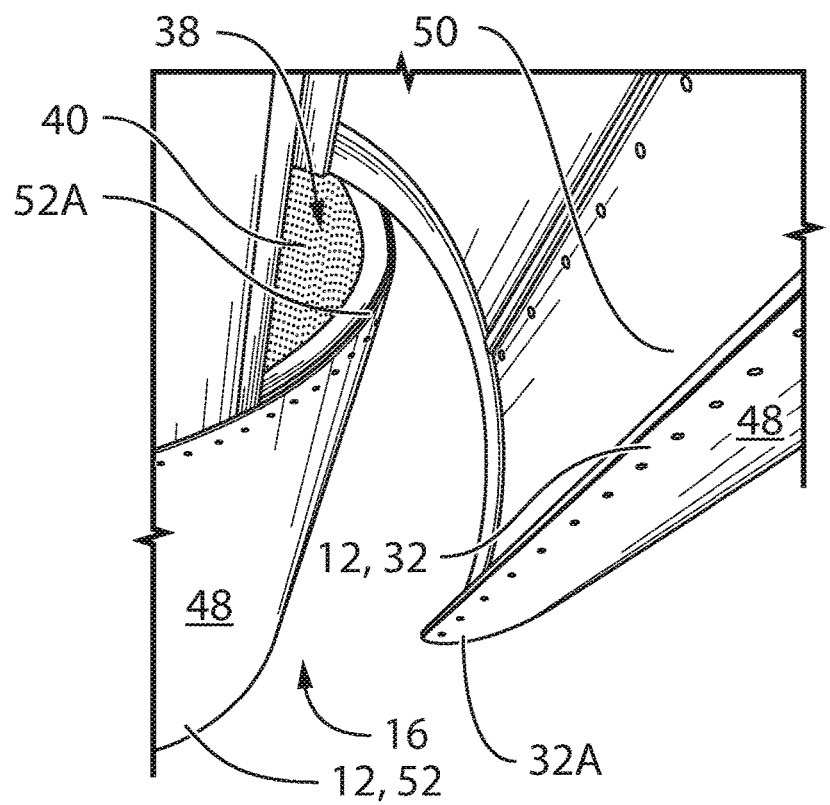
FIG. 7 is a perspective view of a fixed leading edge of a wing of the aircraft of FIG. 1 showing a side edge of the fixed leading edge of the wing.

FIG. 7 is a perspective view of fixed leading edge 52 of wing 16 of aircraft 10. Sound absorber 38 may be disposed in the region of side edge 52A of fixed leading edge 52 of wing 10. Fixed leading edge 52 may comprise one or more skins 48 defining one or more aerodynamic surfaces. Perforated panel 40 may be adjacent the aerodynamic surface. For example, perforated panel 40 may comprise a close-out plate or be part of a closing rib for fixed leading edge 52 and may be disposed at or near side edge 52A of fixed leading edge 52. Accordingly, perforated panel 40 may be oriented transversely to the aerodynamic surface(s). In some embodiments, perforated panel 40 may be substantially orthogonal to the aerodynamic surface(s).

Similarly, sound absorber 38 may be disposed in the region of a side edge of a fixed trailing edge of wing 10. Such installation of sound absorber 38 in a side edge of a fixed trailing edge could be similar to that shown in FIG. 7 and described above so it is not specifically illustrated herein. For example, perforated panel 40 may comprise a close-out plate or be part of a closing rib for a fixed trailing edge and may be disposed at or near a side edge of the fixed trailing edge.

Figure 8A:
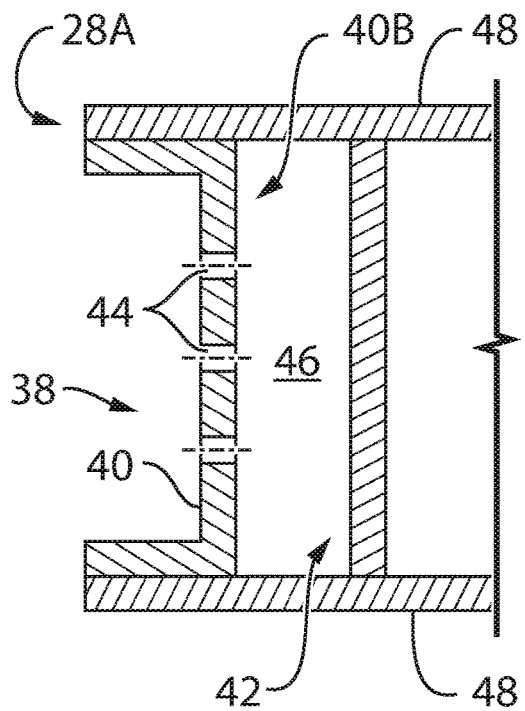
FIGS. 8A-8C are cross-sectional views of exemplary sound absorbers incorporated at or near the side edge of the flap of FIG. 4, taken along line 8-8 in FIG. 4.
Figure 8B:
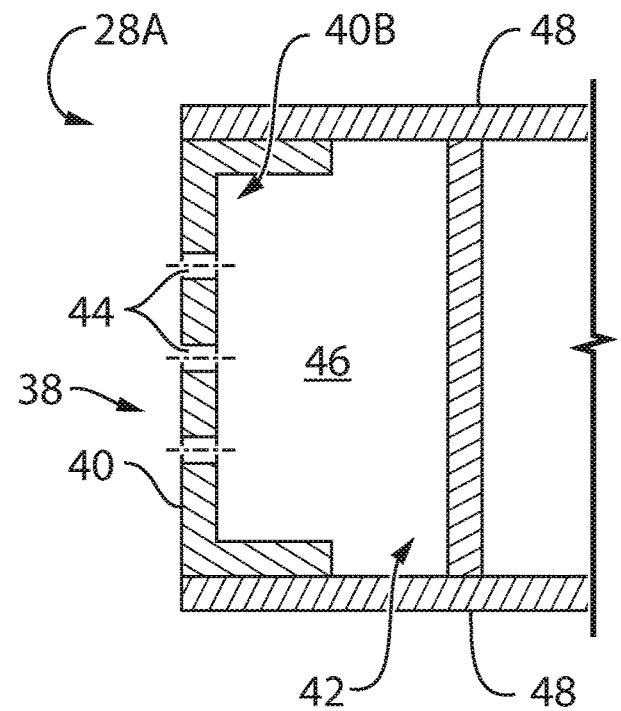
Figure 8C:
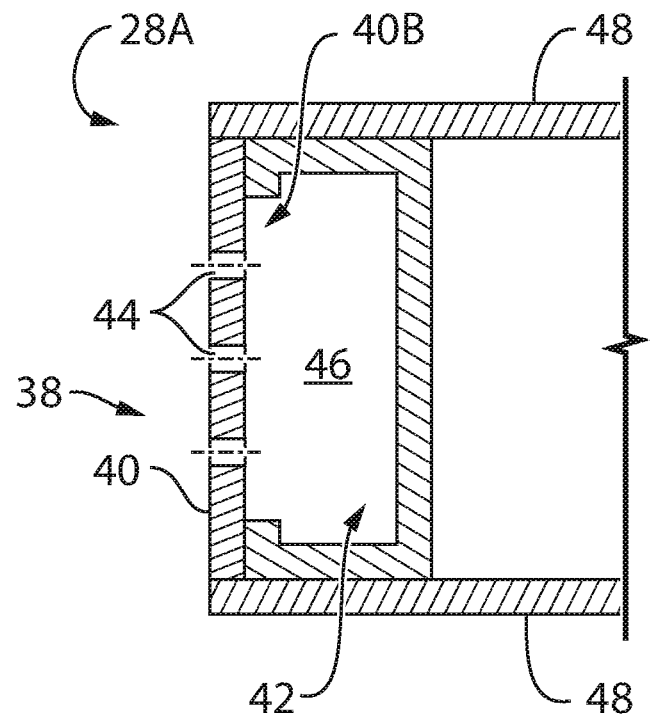

FIGS. 8A-8C are exemplary cross-sectional views of side edge 28A of flap 28 taken along line 8-8 in FIG. 4. FIGS. 8A-8C show different examples of how perforated panel 40 and cavity 46 of sound absorber 38 may be incorporated into flap 28. The exemplary installations of the types shown in FIGS. 8A-8C may also be suitable for incorporating perforated panel 40 and cavity 46 in other airframe components 12 such, as for example, wings 16, slats 30, fixed leading edges 52 and fixed trailing edges. The exemplary installations shown in FIGS. 8A-8C may also be used to form sound absorbers 38 having the configuration shown in FIG. 3. For example, another perforated panel 40-2 could be disposed between perforated panel 40 and boundary surface 42 to form two cavities 46-1 and 46-2 arranged in series.

In reference to FIG. 8A, perforated panel 40 may be part of a closing rib supporting skin 48 of flap 28 and cavity 46 may be defined inside of flap 28. Accordingly, the closing rib providing perforated panel 40 may have a "C" channel configuration and may be mounted to flap 28 according to known or other methods. In some embodiments, an interface between the closing rib and skin 48 may be substantially sealed to provide a substantially air-tight interface. In some embodiments, the closing rib providing perforated panel 40 may be removably connected to flap 28 so as to permit removal of the closing rib for cleaning of cavity 46 or performing other maintenance procedure(s). Boundary surface 42 may be part of an object serving another primary function inside of flap 28. For example, boundary surface 42 may be part of a neighboring structural element such as another rib supporting skin 48. Alternatively, boundary surface 42 may be part of an object (e.g., plate) having a sole function of providing boundary surface 42.

In reference to FIG. 8B, perforated panel 40 may be part of a closing rib supporting skin 48 of flap 28 and cavity 46 may be defined inside of flap 28. Accordingly, the closing rib providing perforated panel 40 may have a "C" channel configuration and may be mounted to flap 28 according to known or other methods. The C-channel of FIG. 8B may be mounted reversely to the C-channel of FIG. 8A. Accordingly, the C-channel of FIG. 8B may provide an increased depth (i.e., in relation to boundary surface 42) of cavity 46 in comparison with that of FIG. 8A. In some embodiments, an interface between the closing rib and skin 48 may be substantially sealed to provide a substantially air-tight interface. In some embodiments, the closing rib providing perforated panel 40 may be removably connected to flap 28 so as to permit removal of the closing rib for cleaning of cavity 46 or performing other maintenance procedure(s). Boundary surface 42 may be part of an object serving another primary function inside of flap 28. For example, boundary surface 42 may be part of a neighboring structural element such as another rib supporting skin 48. Alternatively, boundary surface 42 may be part of an object (e.g., plate) having a sole function of providing boundary surface 42.

In reference to FIG. 8C, perforated panel 40 may comprise a close-out plate and boundary surface 42 may be provided by a rib disposed inside of flap 28 and support skin 48. Accordingly, cavity 46 may be defined inside of flap 28. The rib defining boundary surface 42 may have a "C" channel configuration and may be mounted to flap 28 according to known or other methods. The close-out plate providing perforated panel 40 may also be mounted to flap 28 according to known or other methods. In some embodiments, an interface between the closing rib and skin 48 may be substantially sealed to provide a substantially air-tight interface. In some embodiments, the close-out plate providing perforated panel 40 may be removably connected to flap 28 so as to permit removal of the close-out plate for cleaning of cavity 46 or other maintenance procedure(s). In some embodiments, an interface between the close-out plate providing perforated panel 40 and the closing rib providing boundary surface 42 may be substantially sealed to provide a substantially air-tight interface.

Figure 9:
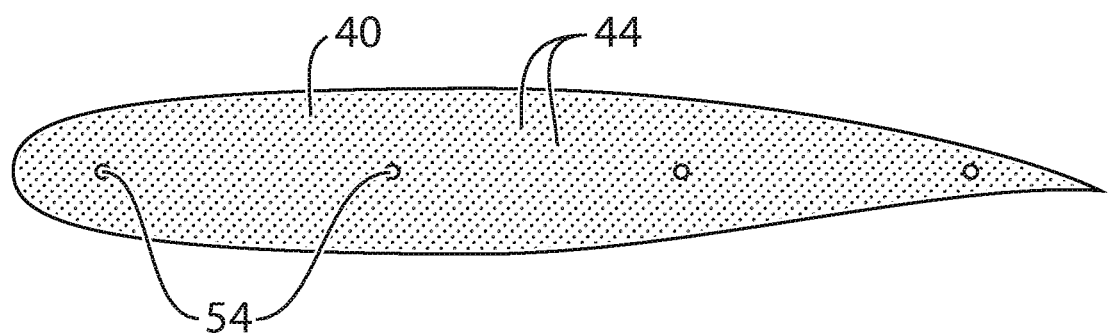
FIG. 9 is a plan view of an exemplary perforated panel of the sound absorber of FIG. 8C.

FIG. 9 is a plan view of an exemplary perforated panel 40 of sound absorber 38 shown in FIG. 8C. As explained above, perforated panel 40 may comprise a close-out plate and may have an outer profile that substantially conforms to the shape of side edge 28A. For example, perforated panel 40 may have an outer profile that substantially conforms to the shape of the internal space defined by skin 48 at or near side edge 28A. For example, perforated panel 40 may have an airfoil shape. In some embodiments, perforated panel 40 may comprise one or more mounting holes 54 that may accommodate a suitable fastener therethrough for the purpose of attaching perforated panel 40 to airframe component 12.

Figure 10:
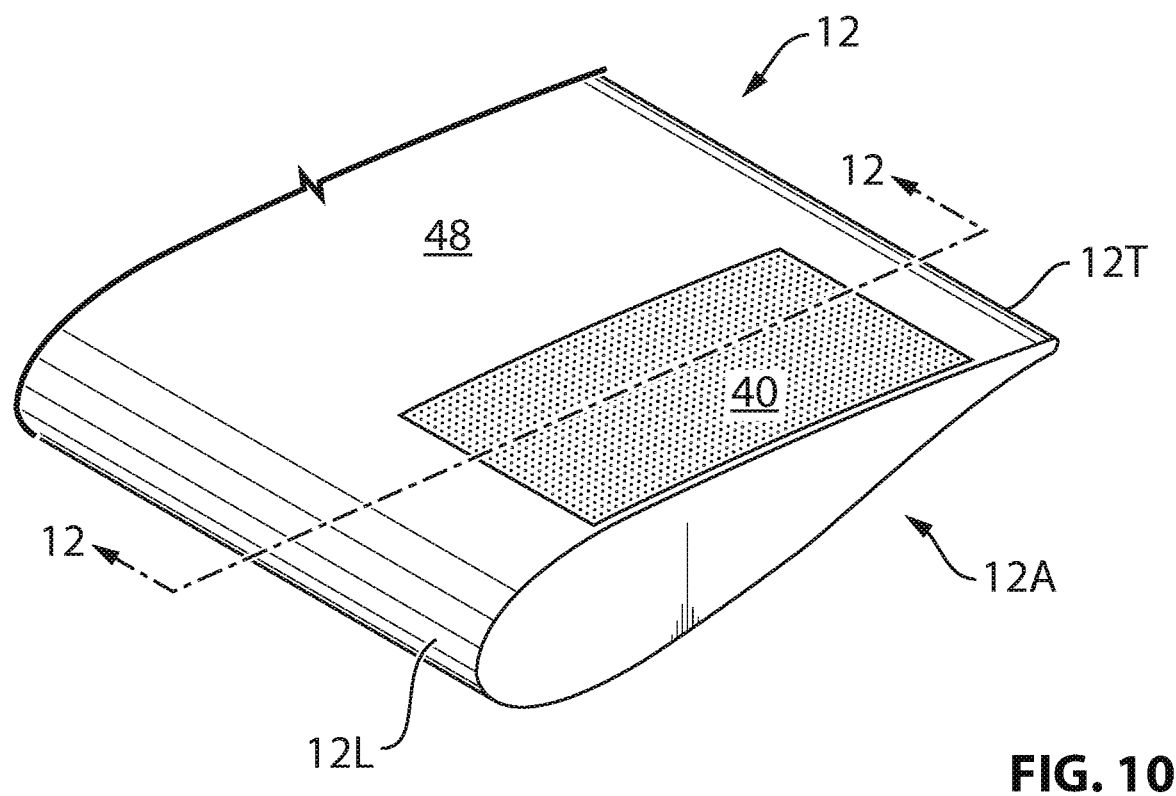
FIG. 10 is a perspective view of an exemplary airframe component comprising a sound absorber with a perforated panel that is substantially parallel to an aerodynamic surface of the airframe component.

FIG. 10 is a perspective view of an exemplary airframe component 12 comprising sound absorber 38 where perforated panel 40 is substantially parallel to an aerodynamic surface of the airframe component 12. Airframe component 12 may have an airfoil shape having leading edge 12L and trailing edge 12T. Perforated panel 40 may define at least part of the aerodynamic surface in cooperation with skin 48 so that perforated panel 40 may effectively replace a portion of skin 48 and have a shape that follows the contour of the aerodynamic surface. Perforated panel 40 may be disposed adjacent side edge 12A of airframe component 12. Perforated panel 40 may be disposed at a distance from leading edge 12L so as not to cover leading edge 12L. For example, perforated panel 40 may be disposed between leading edge 12L and trailing edge 12T. Sound absorber 38 may be disposed on one or both sides of airframe component 12. For example, sound absorber 38 may be disposed on a lower side and/or an upper side of an airfoil-shaped airframe component 12.

Figure 11:
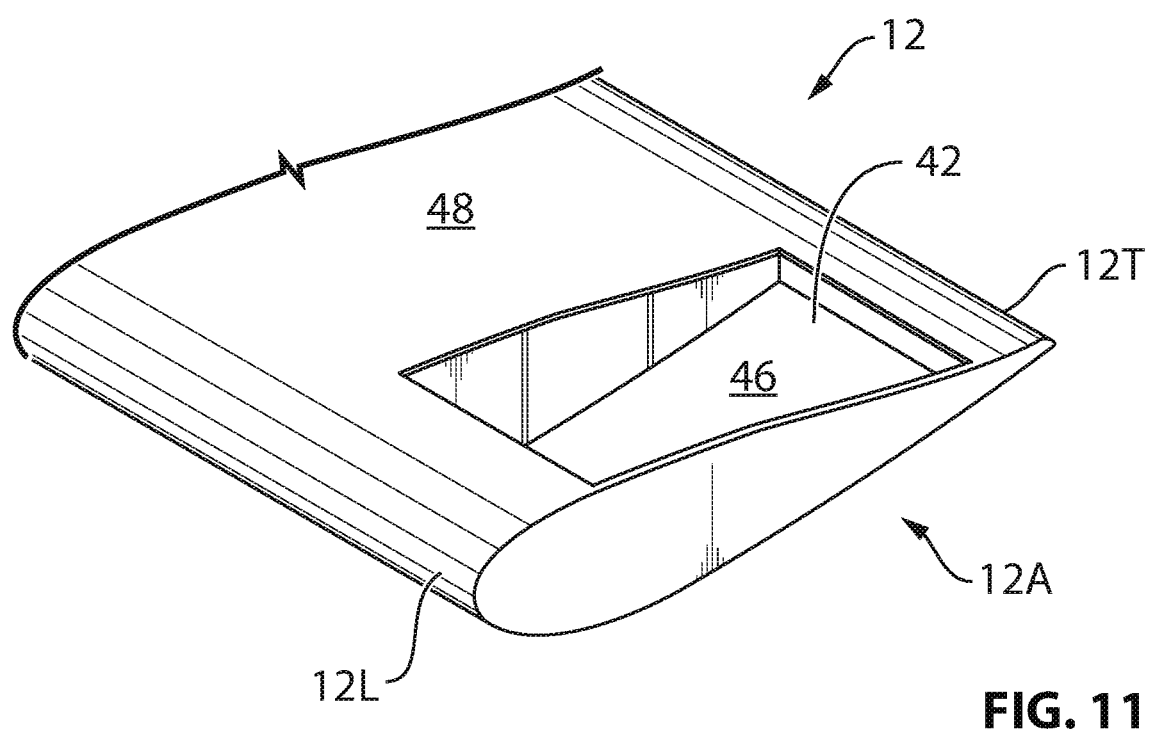
FIG. 11 is a perspective view of the airframe component of FIG. 10 with the perforated panel removed to illustrate an exemplary cavity of the sound absorber.

FIG. 11 is a perspective view of airframe component 12 of FIG. 10 with perforated panel 40 removed so as to illustrate an exemplary cavity 46 of sound absorber.

Figure 12:
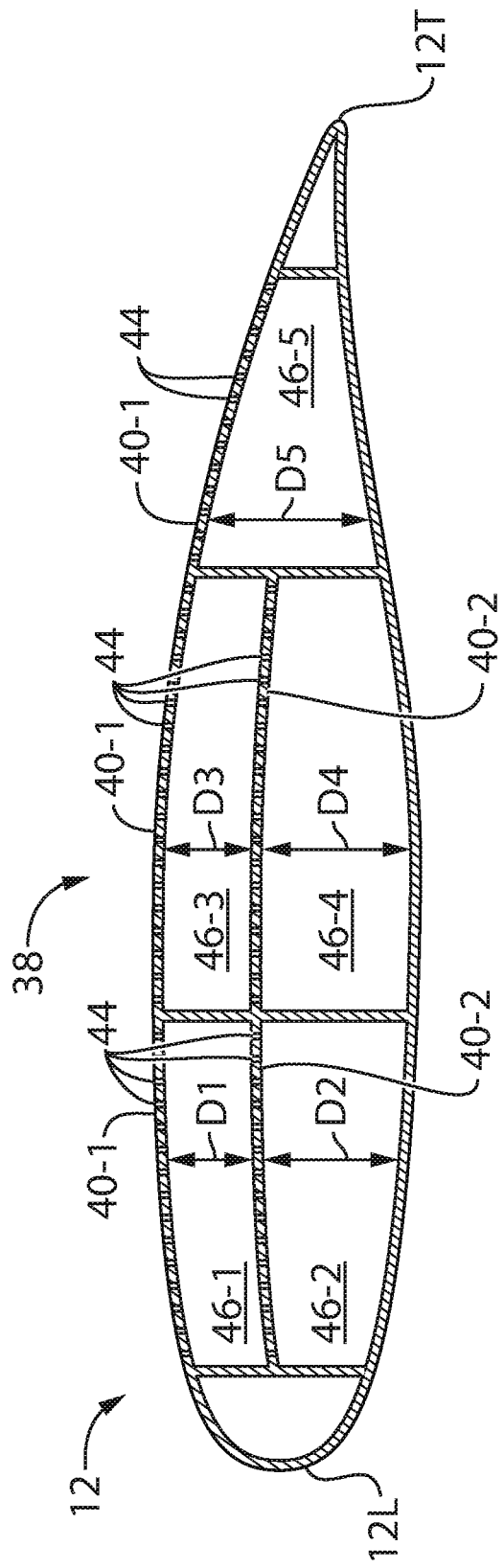
FIG. 12 is a cross-sectional view of the airframe component of FIG. 10 taken along line 12-12 in FIG. 10 to illustrate other exemplary cavities of the sound absorber.

FIG. 12 is a cross-sectional view of the airframe component 12 of FIG. 10 taken along line 12-12 in FIG. 10 to illustrate other exemplary cavities of sound absorber 38. In this particular example, the cavity of sound absorber comprises a number of cavities 46-1 to 46-5 having depths of D1-D5 respectively. Sound absorber 38 may comprise first perforated panel 40-1 and second perforated panel 40-2 disposed in series relative to each other and separated by cavities 46-1 and 46-3. First perforated panel 40-1 may comprise a plurality of panel portions or may comprise a single panel portion extending over cavities 46-1, 46-3 and 46-5. Similarly, second perforated panel 40-2 may comprise a plurality of panel portions or may comprise a single panel portion extending over cavities 46-2 and 46-4. Cavity 46-1 may be disposed acoustically in series with cavity 46-2 and cavity 46-3 may be disposed acoustically in series with cavity 46-4. The walls defining one or more of cavities 46-1 to 46-5 may be sealed with respective perforated walls 40-1 and 40-2 so as to provide a substantially air-tight interface that substantially prevents sound waves from escaping the cavities 46-1 to 46-5 via such interfaces.

Cavities 46-1 to 46-5 may have different depths D1-D5 and accordingly be tuned to attenuate sounds of different frequencies. Also, due to the varying overall thickness of airframe component 12, one or more of cavities 46-1 to 46-5 may have a non-uniform depth D1-D5. For example, in some embodiments, cavities 46-1 and 46-3 may each have an average depth D1, D3 of about 13 mm, cavities 46-2 and 46-4 may each have an average depth D2, D4 of about 22.5 mm and cavity 46-5 may have an average depth D5 of about 20 mm. In various embodiments, the size and configuration of cavity 36 and/or cavities 46-1 to 46-5 may depend on the space available inside of airframe component 12.

Figure 13:
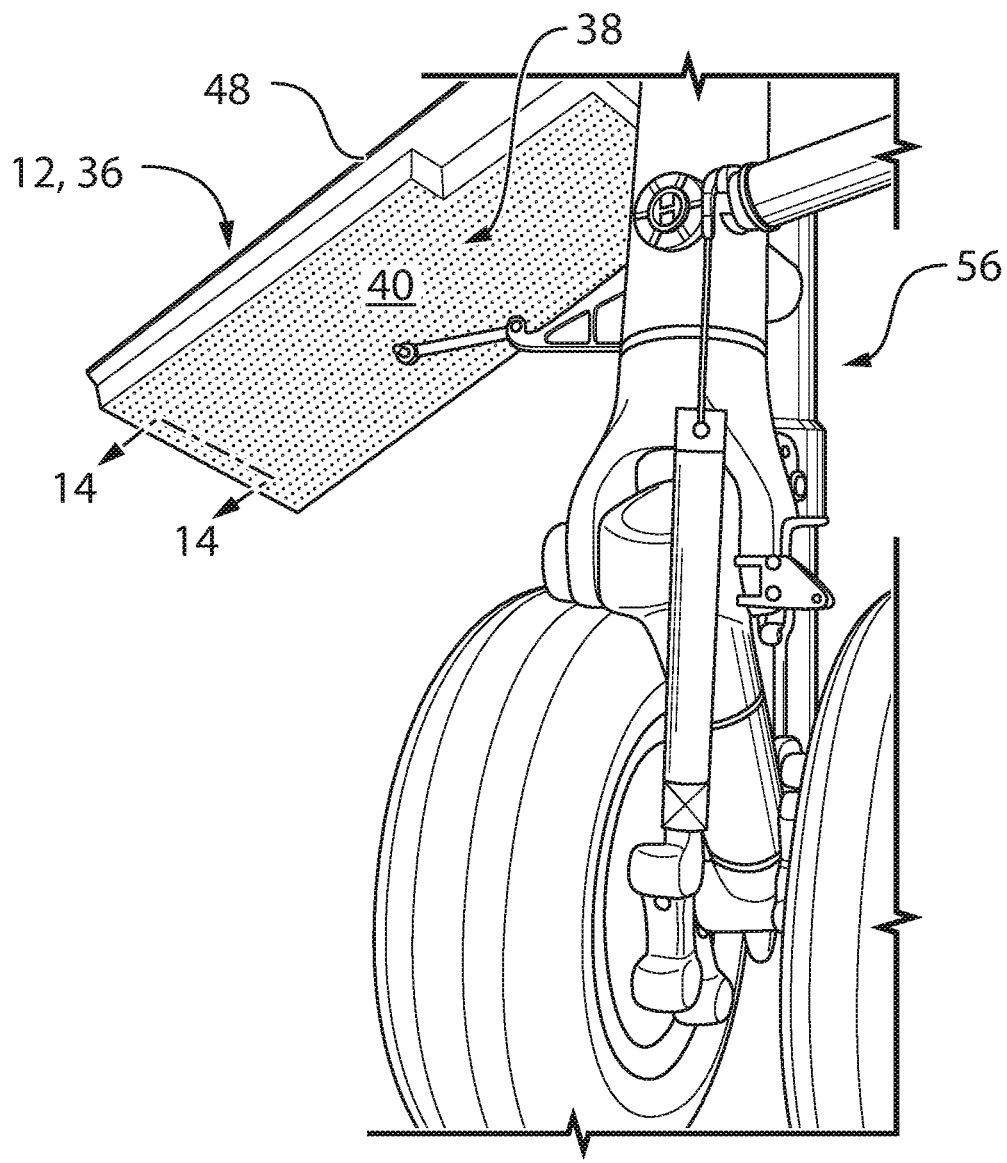
FIG. 13 is a perspective view of an exemplary landing gear assembly and an associated landing gear door of the aircraft of FIG. 1.

FIG. 13 is a perspective view of an exemplary landing gear 56 of aircraft 10 and an associated landing gear door 36. While the specific landing gear door 36 illustrated is that of a main landing gear 56, aspects of the present disclosure would be equally applicable to a door for a nose landing gear. Landing gear door 36 may comprise skin 48 defining an aerodynamic surface on a first side of landing gear door 36 and sound absorber 38. Sound absorber 38 may comprise perforated panel 40 disposed on a second side of landing gear door 36 opposite the aerodynamic surface defined by skin 48.

Figure 14:
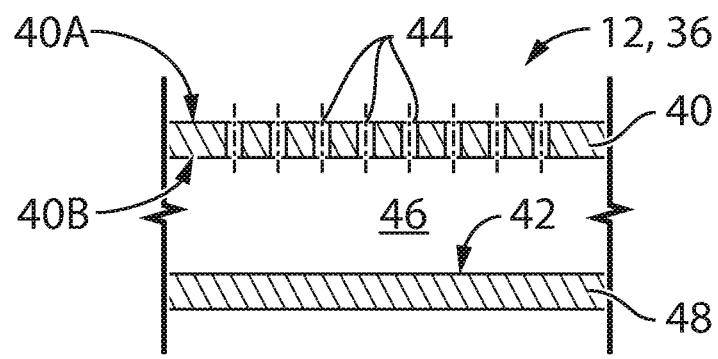
FIG. 14 is a cross-sectional view of the landing gear door of FIG. 13 taken along line 14-14 in FIG. 13.

FIG. 14 is a cross-sectional view of the landing gear door of FIG. 13 taken along line 14-14 in FIG. 13. Perforated panel 40 may have front side 40A exposed to the ambient environment outside of aircraft 10 and opposite back side 40B. Perforated panel 40 may comprise perforation 44 extending through a thickness of perforated panel 40 for permitting passage of sound waves therethrough. Sound absorber 38 may also comprise boundary surface 42 spaced apart from perforated panel 40. Boundary surface 42 and back side 40B of perforated panel 40 may at least partially define cavity 46 inside landing gear door 36 for attenuating some of the sound waves entering cavity 46 via perforations 44 in perforated panel 40.

In some embodiments, boundary surface 42 may be defined by a side of skin 48 opposite the aerodynamic surface. For example, cavity 46 may be defined between perforated panel 40 and skin 48. In some embodiments, cavity 46 may be divided into a plurality of cavities as described above. Cavity 46 may contain air but may otherwise be hollow. For example, cavity 46 may be free of any honeycomb or other cellular (e.g., alveolar) structures therein. In some embodiments, cavity 46 may not contain any other sound-absorbing substance(s) disposed therein.

Figure 15B:
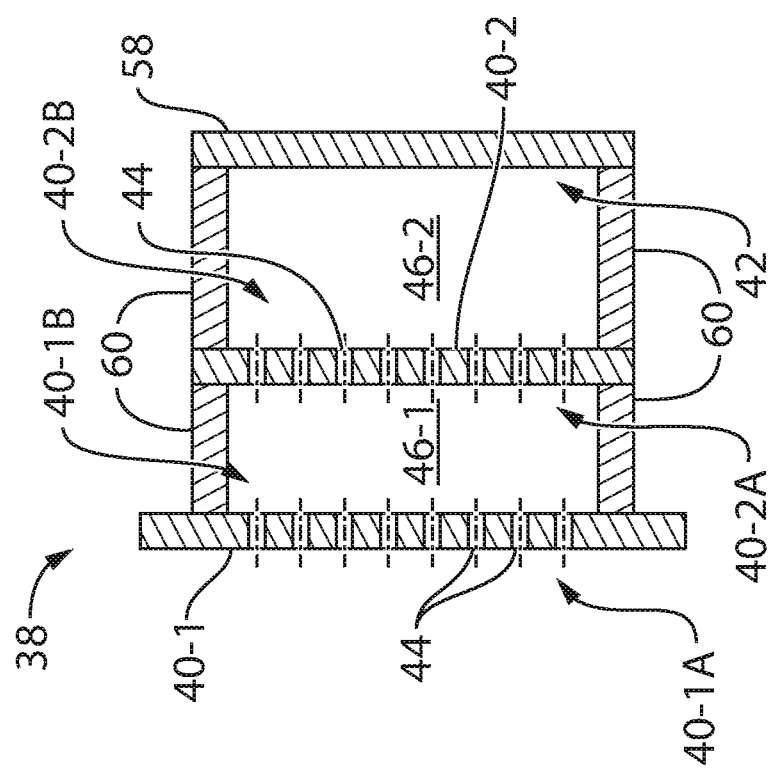
FIGS. 15A and 15B are cross-sectional views of exemplary sound absorbers each having a unitary construction.
Figure 15A:
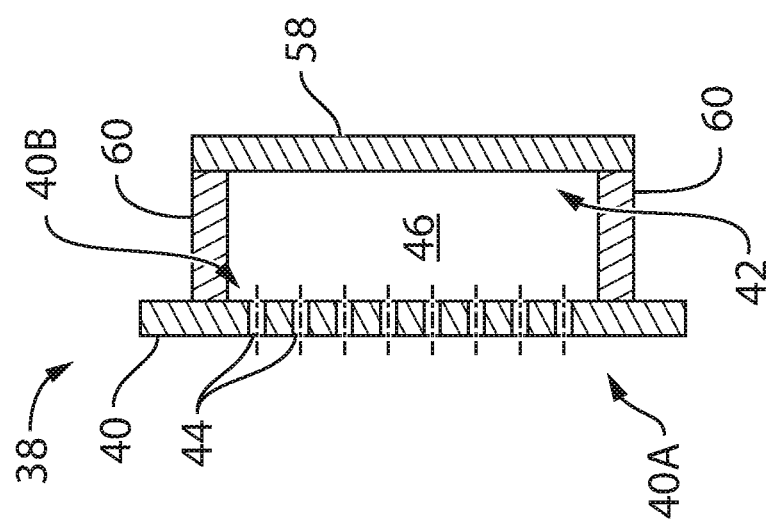

FIGS. 15A and 15B are cross-sectional views of exemplary sound absorbers 38 each having a unitary construction. Sound absorber 38 shown in FIG. 15A is of the type shown in FIG. 2 having a single cavity 46. Sound absorber 38 shown in FIG. 15B is of the type shown in FIG. 3 having two cavities 46-1 and 46-2 disposed in series. The unitary construction of sound absorber 38 as shown in FIGS. 15A and 15B may be used in various embodiments illustrated and/or described herein. Boundary surface 42 may be defined by back wall 58. Back wall 58 may be attached to perforated panel 40 (or 40-1 and/or 40-2) to form sound absorber 38 having a unitary construction. For example, back wall 58 may be attached to perforated panel 40 directly or via one or more side walls 60. In some embodiments, back wall 58, perforated panel 40 and/or side walls 60 may be integrally formed. Alternatively, back wall 58, perforated panel 40 and/or side walls 60 may comprise separate distinct components that have been assembled together to form sound absorber 38 of unitary construction.

The unitary construction of sound absorber 38 may permit the installation and/or removal of sound absorber 38 as a unit into/from any of the airframe components 12 mentioned herein. In some embodiments, side walls 60 may be bonded or otherwise fastened to perforated panel 40 and/or back wall 48. For example, the interface between side walls 60 and perforated panel 40 may provide a substantially air-tight seal. The interface between side walls 60 and perforated panel 40 may substantially prevent sound waves from escaping cavity 46 via such interface(s).

Cavity 46 (or cavities 46-1 and 46-2) may be defined based on the shape/size/configuration of the space available inside of airframe component 12 for sound absorber 38. In some cases, one or more sound absorbers 38 of the type described herein may be retrofitted into an existing airframe component 12. In such instance, the space available to accommodate sound absorbers 38 on airframe component 12 may be measured and sound absorber(s) 38 may be produced to fit within the allocated space. For example, such measurements may be obtained by first producing a mold of the available space and sound absorber(s) 38 may be produced to substantially conform to the shape/size/configuration of the mold so that sound absorber(s) 38 may fit into the allocated space and also substantially maximize the use of the space available for sound attenuation.

FIG. 16 shows plots 62, 64, 66 of absorption coefficients as a function of frequency for three different sound absorbers 38 according to the present disclosure. Plots 62, 64, 66 provide an indication of acoustic performance for three sound absorbers 38 of different configurations. The abscissa (x-axis) represents the frequency (Hz) of the sound in log scale and the ordinate (y-axis) represents the absorption coefficient where alpha is the ratio of the sound intensity absorbed over the incident sound intensity. Plot 62 illustrates the relationship between the absorption coefficient and frequency for an exemplary sound absorber 38 having a cavity 46 in accordance with the present disclosure where the cavity 46 has a depth D of about 13 mm. Plot 64 illustrates the relationship between the absorption coefficient and frequency for an exemplary sound absorber 38 having a single cavity 46 in accordance with the present disclosure where cavity 46 has a depth D of about 20 mm. Plot 66 illustrates the relationship between the absorption coefficient and frequency for an exemplary sound absorber 38 having two cavities 46-1, 46-2 in series (see FIG. 3) in accordance with the present disclosure where first cavity 46-1 has a depth D1 of about 13 mm and second cavity 46-2 has a depth of about 22.5 mm.

Plots 62, 64 and 66 of FIG. 16 show that the use of two cavities 46-1 and 46-1 in series (i.e., plot 66) has a wider absorptive bandwidth in comparison with using a single cavity 46. Plot 66 shows an effective 0.55 absorption coefficient from about 900 Hz to about 3000 Hz which is within the typical wing tip model noise spectrum. Plots 62, 64 and 66 are sound absorption calculations based on diffused field incidence.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the components, devices and assemblies disclosed and shown herein may comprise a specific number of elements components, devices and assemblies could be modified to include additional or fewer of such elements. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples disclosed herein, but should be given the broadest interpretation consistent with the description as a whole.

What is claimed is:

1. An airframe component of an aircraft, the airframe component comprising:

a skin defining an aerodynamic surface having a side edge; and a sound absorber comprising:

a perforated panel disposed at or adjacent the side edge of the aerodynamic surface, the perforated panel having a front side exposed to an ambient environment outside of the airframe component and an opposite back side, the panel comprising perforations extending through a thickness of the panel for permitting passage of sound waves therethrough; and a boundary surface spaced apart from the perforated panel, the boundary surface and the back side of the perforated panel at least partially defining a cavity in the airframe component for attenuating some of the sound waves entering the cavity via the perforations in the perforated panel;

wherein either the perforated panel or the boundary surface is defined by a rib of the airframe component, the rib supporting the skin and having a C-channel configuration.

2. The airframe component as defined in claim 1, wherein a distance between the boundary surface and the back side of the perforated panel is between 1 cm and 10 cm.

3. The airframe component as defined in claim 1, wherein an average cross-sectional dimension of the perforations is less than 1 mm.

4. The airframe component as defined in claim 1, wherein the perforated panel has a perforation percentage between 0.5% and 10%.

5. The airframe component as defined in claim 1, wherein the cavity is free of cellular structures.

6. The airframe component as defined in claim 1, wherein the perforated panel is oriented transversely to the aerodynamic surface.

7. The airframe component as defined in claim 1, wherein the airframe component comprises a high-lift device.

8. The airframe component as defined in claim 1, wherein the airframe component comprises a flap.

9. The airframe component as defined in claim 1, wherein the airframe component comprises a slat.

10. The airframe component as defined in claim 1, wherein the airframe component is deployable.

11. The airframe component as defined in claim 1, wherein the airframe component comprises a fixed leading edge.

12. The airframe component as defined in claim 1, wherein the boundary surface is defined by the rib and the perforated panel comprises a close-out plate of a high-lift device.

13. The airframe component as defined in claim 1, wherein the boundary surface is defined by a wall that is attached to the perforated panel.

14. The airframe component as defined in claim 13, wherein an air-tight seal is provided between the wall and the perforated panel.

15. The airframe component as defined in claim 13, wherein the wall and the perforated panel have a unitary construction.

16. The airframe component as defined in claim 1, wherein the perforated panel is a first perforated panel and the airframe component comprises a second perforated panel disposed between the first perforated panel and the boundary surface to form two internal sound-attenuating cavities in series between the back side of the first perforated panel and the boundary surface.

17. An aircraft comprising the airframe component defined in claim 1.

18. An airframe component of an aircraft, the airframe component comprising:
   a skin defining an aerodynamic surface;
   a closing rib supporting the skin, the closing rib comprising perforations extending through a thickness of the closing rib for permitting passage of sound waves therethrough, the closing rib having a C-channel configuration; and
   a boundary surface spaced apart from the closing rib, the boundary surface and the closing rib at least partially defining a cavity in the airframe component for attenuating some of the sound entering the cavity via the perforations in the closing rib.

19. The airframe component as defined in claim 18, comprising a perforated panel disposed between the closing rib and the boundary surface to form two internal sound-attenuating cavities in series between the closing rib and the boundary surface.

20. The airframe component as defined in claim 18, wherein the airframe component comprises a high-lift device.

21. The airframe component as defined in claim 18, wherein the airframe component comprises a fixed leading edge.

22. The airframe component as defined in claim 18, wherein the cavity is free of cellular structures.

23. An aircraft comprising the airframe component defined in claim 18.

24. An airframe component of an aircraft, the airframe component comprising:
   a skin defining an aerodynamic surface having a side edge; and
   a close-out plate disposed at or adjacent the side edge of the aerodynamic surface, the close-out plate having a front side exposed to an ambient environment outside of the airframe component and a back side, the close-out plate comprising perforations extending through a thickness of the close-out plate for permitting passage of sound waves therethrough; and
   a rib supporting the skin, the rib comprising a boundary surface spaced apart from the close-out plate, the boundary surface and the back side of the close-out plate at least partially defining a cavity in the airframe component for attenuating some of the sound waves entering the cavity via the perforations in the close-out plate, the rib having a C-channel configuration.

25. The airframe component as defined in claim 24, wherein the airframe component comprises a high-lift device.

26. The airframe component as defined in claim 24, wherein the airframe component comprises a fixed leading edge.

27. The airframe component as defined in claim 24, wherein the cavity is free of cellular structures.

28. An aircraft comprising the airframe component defined in claim 24.

* * * * *